Patented Aug. 10, 1954

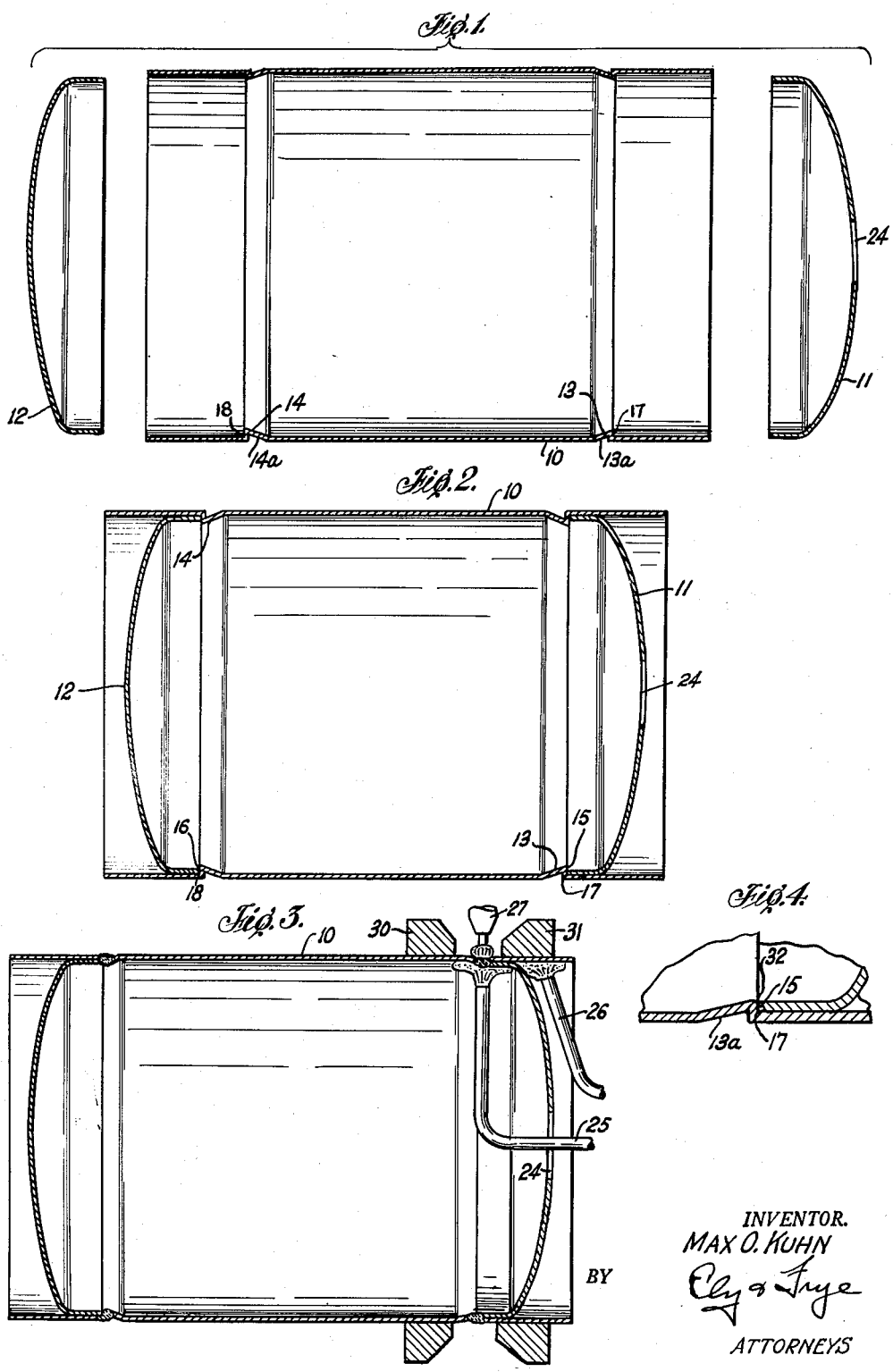

2,685,857

UNITED STATES PATENT OFFICE 2,685,857

METHOD OF PRODUCING CONTAINERS FROM THIN GAUGE STAINLESS STEEL

Max O. Kuhn, Quincy, Ill., assignor to The Firestone Tire & Rubber Company, Akron, Ohio, a corporation of Ohio Original application November 19, 1947, Serial No. 786,921. Divided and this application October 27, 1950, Serial No. 192,583

1 Claim. (Cl. 113—120)

This invention relates to welding methods, especially to a method of fusion welding a continuous seam in a tubular or hollow article.

This application is a division of my copending application, Serial Number 786,921, filed November 19, 1947, now abandoned.

Heretofore, in the production of various articles for containing food or other consumable articles, various types of welded constructions have been proposed. For example, in the construction of milk cans, beverage containers, and the like, the containers are conventionally manufactured by forming a sleeve-like body portion and butt welding suitable dished end caps thereto. Such containers are frequently made of low carbon steel and finished by a hot tin dip. Tin coatings thus applied frequently wear off as the result of repetitive cleaning operations necessitating periodic retinning. To avoid these retinning operations while maintaining the desired non-corrosive properties, employment of stainless steel has been suggested.

Stainless steel has the advantage of presenting a non-corrosive surface which is easily cleaned and which need not be refinished while in use. However, considerations of cost require the stainless steel stock to be of thin gauge to save material. Use of thin gauge material also reduces the weight of the container. The material is usually so thin, .036 inch or less in thickness, as to make it impracticable to butt weld the caps of the container to the body portion and rather serious problems in welding the parts have arisen.

The difficulty mainly arises from the fact that the end cap members are hidden within the body portion of the container so that it is not possible to determine visually whether the parts are accurately assembled for welding. If the parts are not properly positioned the welding torch can not be accurately located with respect to the area to be welded and either overheating or underheating is likely to occur. The result is that the welded seam will not be smooth and continuous or the stock will be burned through before a sound weld is obtained. Moreover, if the parts are not closely spaced even with proper torch positioning the well will not consistently be of high quality and welding times will be longer.

The present invention provides an improved method of welding relatively thin stainless steel to produce such containers. The method owes its success to two main features, the proper positioning of the parts relative to each other and the snug abutment of the surfaces to be welded with each other. In the preferred form of the invention, the body portion of the container is provided with an inwardly projecting shoulder which acts as a stop to position a telescoping cap member inserted therein. The shoulder has a surface of appreciable length extending at approximately right angles to the body and forming a sharp corner with the body. This sharp corner by acting as a positive stop provides proper positioning of the parts, and by reducing the crevice between the outer edge of the cap member and the shoulder ensures a continuous smooth weld. The parts can be welded on relatively simple welding apparatus and with a minimum of handling. Such positive positioning of the parts also insures that the welding torch will be properly located relative to the joint between the parts and a faster and better weld can be made.

A general object of the present invention is to avoid and overcome the foregoing and other problems and disadvantages of prior methods of forming welded joints and to provide an effective, positive method of obtaining satisfactory welded joints, especially as applied to containers of light gauge metal containers.

Another object is to provide means for assembling a pair of telescoping tubular articles in a manner which provides positive positioning of the articles and snug interfitting of the parts to enable faster and better welding to be accomplished.

Another object of the invention is to provide such a welding method capable of giving consistently satisfactory results under production conditions.

A further object of the invention is to provide an improved continuous method of fusion welding two surfaces together.

The foregoing and other objects and advantages of the invention will be made apparent from the following description of the invention in which reference is made to the accompanying drawings, wherein:

Fig. 1 is an exploded view, in longitudinal section, of the various parts of a container to be welded together in accordance with the principles of the invention;

Fig. 2 is a longitudinal section of a container ready for welding in accordance with the principles of the invention;

Fig. 3 shows in longitudinal section a partially fabricated container being processed in accordance with the invention;

Fig. 4 is a fragmentary section on an enlarged scale showing the shoulder construction of the container of Figure 2.

As best shown in Fig. 1, a container formed according to the invention comprises a tubular body portion 10 formed from flat stock rolled into cylindrical form with its edges butt-welded along a longitudinal seam. The ends of the container are closed by end cap members 11 and 12 which are of a size to be telescoped into the ends of cylinder 10, in pressed fit engagement therewith.

One of the features of the present invention is the inwardly extending shoulders 13 and 14 which are formed in the body 10 to act as positioning stops for the end caps 11 and 12. These shoulders are formed in such a manner as to have surfaces 15 and 16 extending at right angles to the longitudinal axis of the body 10 and intersecting the body in sharply defined corners 17 and 18, see Figure 4. When the cap members are inserted in the body their end edges will fit snugly against the perpendicular surfaces 15 and 16 and seat within the sharp corners 17 and 18. In the absence of the perpendicular surfaces and the sharp corners the cap members would have a tendency to ride past their proper positions in the step of assembly, but with such a construction there is no danger that the cap members will fail to be properly positioned.

The shoulders are formed by rolling the body between a pair of rotary die members which produce the desired sharp right-angled corners by gripping the body forcibly between them while rolling it to form the circumferential grooves and shoulders. Each of the die members have cooperating relatively sharp edges and the members are spaced apart so that the edges are separated a distance equal the thickness of the stock. These edges bite into the metal to form the sharp corners. In other respects the die members are conventional, taking the form respectively of a supporting mandrel adapted to extend within the body 10, and an external member supported externally of the body and being movable toward the mandrel to pinch and shape the wall of the body 10 between them. One or both of the die members may be driven to impart a rotary movement to the body for the grooving operation.

To assemble the parts, the end cap members 11 and 12 and the body 10 are held in appropriate chucks. The end caps are then moved forcibly by their chucks into the body until their edges abut the shoulders 13 and 14. The chucks for the cap members are preferably pneumatically operated so that they will urge the parts together with a force of about five pounds.

The assembled parts are welded by fusion, heat being applied by means of a torch to each of the localized zones adjacent the grooves 13a and 14a on the outer wall surface of the body 10 the grooves acting as guides for the torch. Heat is conducted to the abutting surfaces of the end caps and to the annular shoulders to fuse the surfaces together forming a welded seam devoid of crevices or laps, and having a smooth unbroken surface.

The welding process is preferably carried on in the manner and with the apparatus shown in Figure 3. It will be noted that end cap 11 is provided with aperture 24 centrally thereof, for the ultimate receipt of a plug or other closure member; aperture 24 is utilized, during welding, for the insertion into the container of conduit 25, positioned to extend at right angles to the axis of the container body 10 to a point adjacent the outer surface of cap 11 at the crown thereof. Conduits 25 and 26 connect to a source of an inert or reducing gas so that an inert or reducing atmosphere may be maintained at the area of weld interiorly of the container. The welding nozzle or torch 27 which supplies the welding heat is conventional. A pair of chill rings 30 and 31 are telescoped over body portion 10 and positioned adjacent each side of the groove 13 for the purpose of confining the heat to the weld area; the rings having sufficient mass to effectively withdraw and store a large quantity of heat from body 10 and from the end cap 11 to localize the heat to the welding area and to prevent excessive heating of any large areas. The body and end members are rotated with respect to the stationary torch 27 at a speed slow enough to melt the metal and effect fusion between the cap 12 and the shoulder 13 of the body to produce the desired tight, continuous welding of the parts and fast enough to prevent burning through of the metal.

It will be noted that the fit of the edges of the end caps into the sharp corners and against the perpendicular surfaces of the shoulders is such that only a small crevice indicated at 32 exists between the parts before welding. When the welding heat is applied to fuse the metal, the surfaces of the crevice will readily pull together to form a smooth unbroken surface. If the shoulder were rounded or of such a shape that a rather large crevice existed, the crevice would fill in during welding only with difficulty, if indeed at all. The present invention thus offers greater assurance that the weld will fill in completely to form a smooth continuous surface. Moreover such a weld requires less welding time than is the case where a large wide-open crevice is present.

The welding method disclosed herein results in fluid-tight bonds between metal surfaces without the necessity of supplying any additional metal thereto. Since only the metal of the abutting surfaces is caused to fuse together, a smooth joint, free of crevices and rough spots common in conventional welded joints results. The joint is therefore ideal for employment in containers adapted to contain edible material. The method is applicable to other uses during manufacturing process wherein a smooth and easily cleaned joint is desired.

While a preferred embodiment of the invention has been illustrated and described in detail herein, it will be understood that the invention is not limited to the specific example set forth since modification may be resorted to wtihin the scope of the appended claim.

I claim:

The method of producing a container from stainless steel of relatively thin gauge stock by joining a body member to a closed end member, said members having telescoping cylindrical portions, which comprises the steps of grooving the body member to form a circumferentially extending annular shoulder projecting inwardly from the circumferential surface thereof, the shoulder having an annular surface extending at substantially right angles to the axis of said members and joining with said circumferential surface to form a sharp corner therewith, assembling the end member with the grooved body member with the end edge of said end member abutting said annular surface and fitting snugly within said corner without the formation of a substantial open crevice, applying welding heat to said members adjacent said groove causing said shoulder and said end edge of said other member to weld together by fusion to form a substantially smooth continuous weld surface.

References Cited in the file of this patent

UNITED STATES PATENTS

| Number | Name | Date |
|---|---|---|
| 774,041 | Coffin | Nov. 1, 1904 |
| 1,013,810 | Peacock | Jan. 2, 1912 |
| 1,097,744 | Avery et al. | May 26, 1914 |
| 1,673,256 | McCrery | June 12, 1928 |
| 1,701,636 | Richman | Feb. 12, 1929 |
| 1,719,153 | Wertz | July 2, 1929 |
| 1,744,945 | Bayles | June 28, 1930 |
| 2,015,193 | Reed | Sept. 24, 1935 |
| 2,091,307 | Catlett | Aug. 31, 1937 |
| 2,210,277 | Bullock | Aug. 6, 1940 |
| 2,350,720 | Brodie | June 6, 1944 |